April 17, 1962    J. M. KOZLOVIC ET AL    3,030,463
LEVERING MECHANISM FOR METAL-CLAD SWITCHGEAR
Filed April 29, 1960    3 Sheets-Sheet 1

WITNESSES:
Kw. L. Groome
James F. Young

INVENTORS
John M. Kozlovic and
Robert E. Wobrak.
BY
Ralph W. McIntire
ATTORNEY

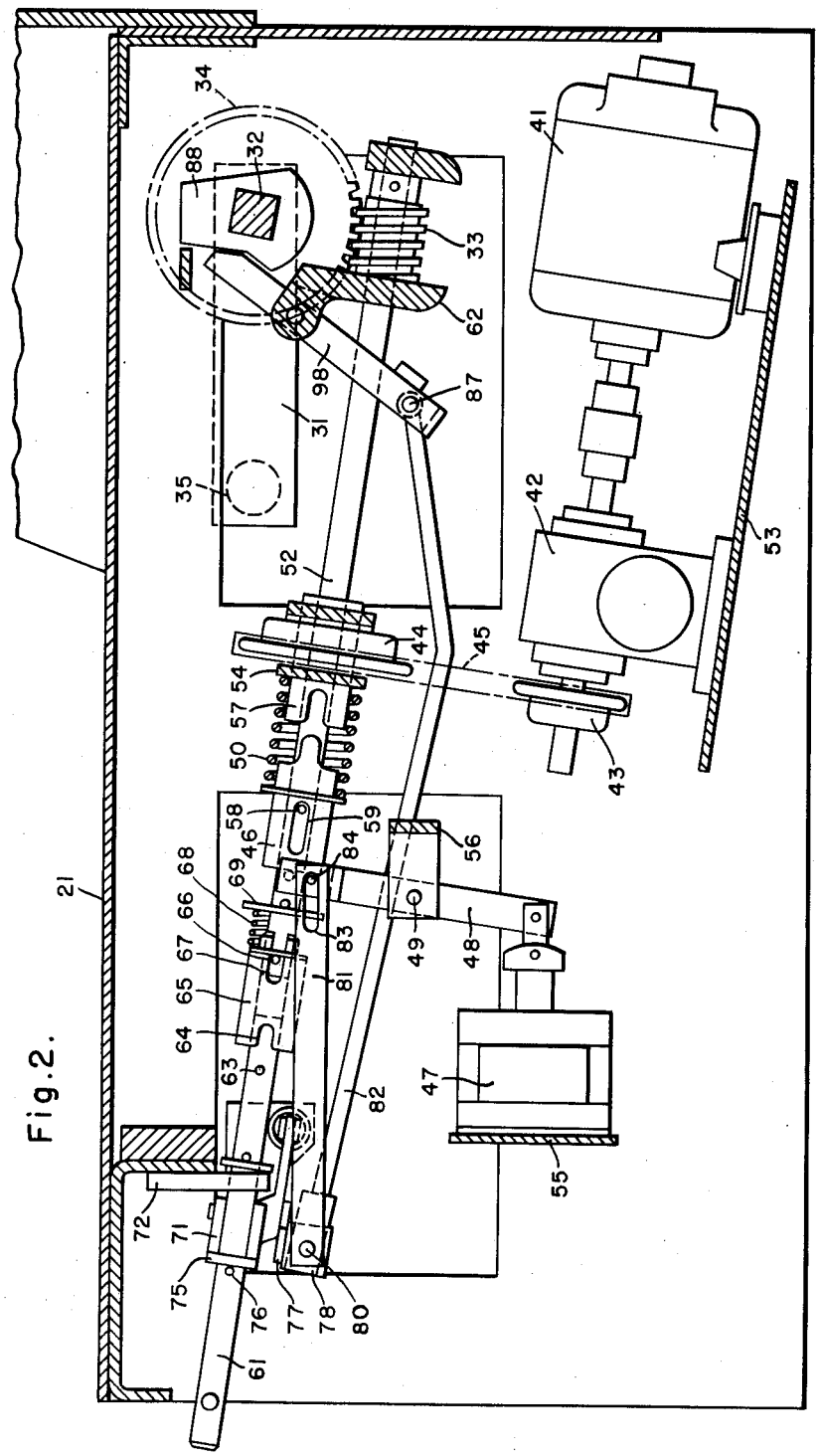

April 17, 1962  J. M. KOZLOVIC ET AL  3,030,463
LEVERING MECHANISM FOR METAL-CLAD SWITCHGEAR
Filed April 29, 1960  3 Sheets-Sheet 3
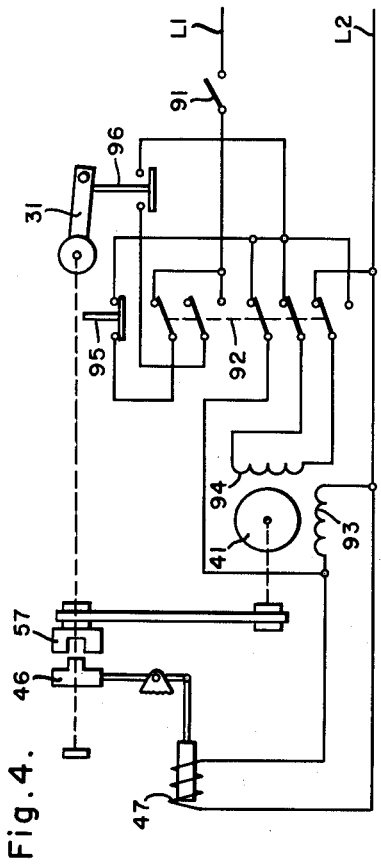
Fig. 4.
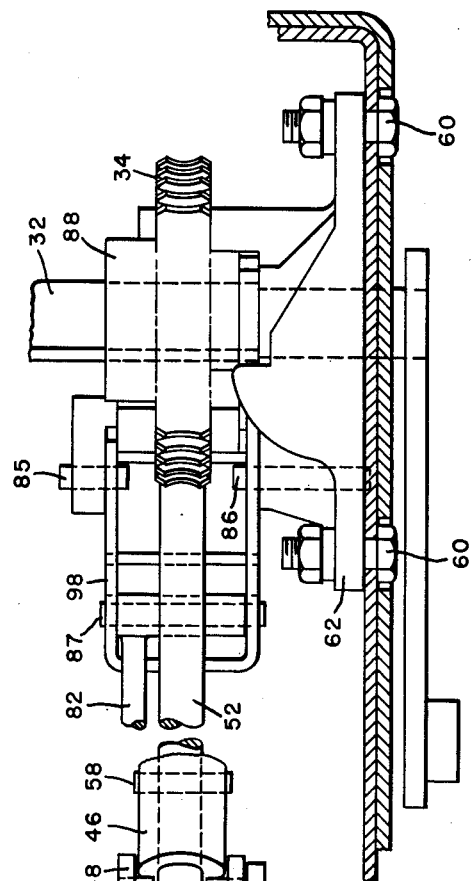
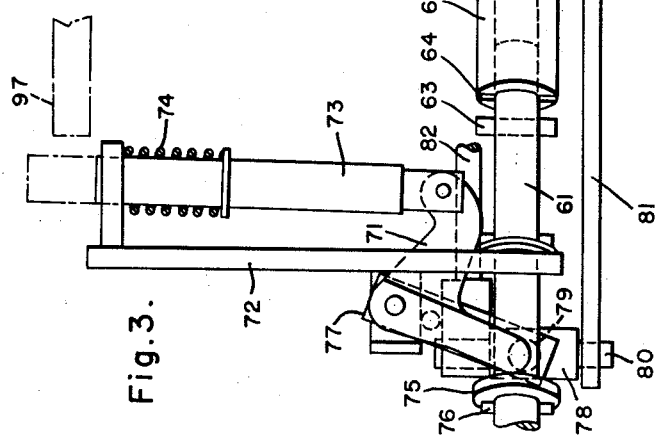
Fig. 3.

3,030,463
LEVERING MECHANISM FOR METAL-CLAD
SWITCHGEAR
John M. Kozlovic, Greensburg, and Robert E. Wobrak,
Wilkinsburg, Pa., assignors to Westinghouse Electric
Corporation, East Pittsburgh, Pa., a corporation of
Pennsylvania
Filed Apr. 29, 1960, Ser. No. 25,771
6 Claims. (Cl. 200—50)

This invention relates, generally, to metal-clad switchgear and, more particularly, to improved levering mechanisms and interlocking mechanisms for metal-clad switchgear having removable circuit breaker units.

In metal-clad switchgear of the type described in Patent No. 2,792,462, issued May 14, 1957 to J. M. Kozlovic and assigned to the same assignee as the present application, a circuit breaker unit is moved between a connected position and a test position by a levering device including a shaft rotated by a motor connected to the shaft by an electrically operable clutch mechanism, and wherein a first portion of an interlock mechanism responds to an engagement operation of the clutch to prevent closing of the breaker, and a second portion of the interlock device responds to cam means on the levering device to maintain the first portion of the interlock mechanism in the interlock position to prevent closing of the breaker while it is at any position between the connected and the test position, and further responds to a releasing operation of the clutch at the termination of the connecting operation to release the interlock mechanism to thus permit closing of the breaker. Accordingly, if the clutch should bind so as to fail to release, the interlock device cannot release and the breaker contacts cannot be closed even though the breaker has been completely connected. If the clutch fails to release and an attempt is made to close the breaker electrically, the fuse in the closing circuit would blow, or if no fuse is present, the closing coil would burn out.

Accordingly, it is an object of this invention to provide in a levering apparatus in combination with an interlocking device in switchgear of the type described, an improved interlock mechanism for releasing the interlock mechanism at the completion of a breaker connecting operation, even if the clutch mechanism should fail to release.

Other objects of this invention will be explained fully hereinafter or will be apparent to those skilled in the art.

In accordance with one embodiment of this invention, there is provided a levering device for moving a circuit breaker unit between connected and test positions in a switchgear cell, which levering device may be manually operated by means of a crank which rotates a shaft, or the same shaft may be driven by an electric motor which is connected to the shaft by an electrically actuated clutch, all in the manner substantially the same as that disclosed in the previously mentioned Kozlovic patent. The interlocking mechanism is adapted to be operated to prevent closing of the breaker in response to an engagement operation of the clutch. The interlocking mechanism is adapted to be released solely in response to the final condition of the levering device when the breaker is in either the connected or test positions, thus effecting release of the interlocking mechanism independently of the clutch and irrespective of the condition of operation of the clutch.

For a better understanding of the nature and objects of the invention, reference may be had to the following detailed description, taken in conjunction with the accompanying drawings, in which:

FIG. 2 is an enlarged view, partly in side elevation and partly in section, of the interlocking mechanism and the levering device for moving the breaker unit in the cell between the connected and the test positions;

FIG. 3 is an enlarged view, partly in plan and partly in section of the interlocking mechanism and a portion of the levering device; and, FIG. 4 is a diagrammatic view of a system for controlling the operation of the electrically operated levering device.

Figure 1:
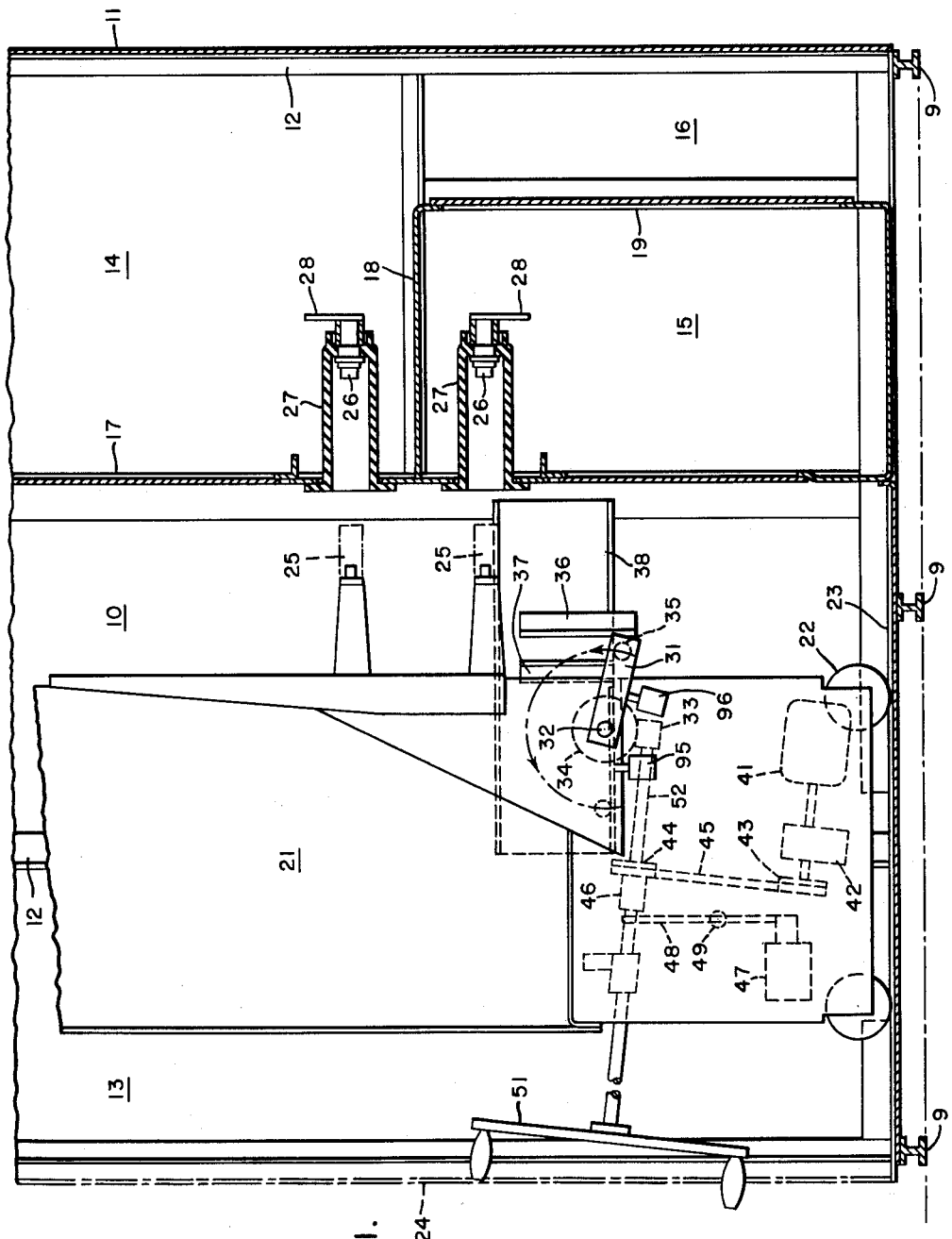
FIGURE 1 is a view, partly in side elevation and partly in section, of a portion of a metal-clad switchgear structure embodying the principal features of the invention.

Referring to the drawings, and particularly to FIG. 1, the structure shown therein comprises a portion of a metal-clad switchgear cell housing 10 which may be constructed by securing sheet metal members 11 to angle frame members 12 in a manner known in the art. The cell structure may rest upon beams 9 disposed upon a suitable foundation. The cell 10 comprises a circuit breaker compartment 13, a current transformer compartment 14, a bus compartment 15 and an outgoing cable compartment 16. The various compartments are separated by partition members 17, 18 and 19.

A circuit breaker unit 21 is disposed in the breaker compartment 13 and may be moved horizontally into and out of the cell on wheels 22 which run on rails 23 disposed at the bottom of the cell. A hinged door 24 is provided at the front of the cell to permit the breaker unit to be withdrawn from the cell. In accordance with the usual practice, the breaker unit is provided with primary disconnecting contact members 25 which are disposed to engage stationary contact members 26 which are mounted inside insulating sleeves 27 disposed inside the cell 10. The disconnecting contact members may be of the type described in Patent No. 2,376,818, issued May 22, 1945, to M. J. Rubel and assigned to the Westinghouse Electric Corporation.

In accordance with the usual practice, a levering device is provided for mechanically moving the circuit breaker unit 21 between the operating or connected position and the test or disconnected position within the cell 10. In the present drawing, the circuit breaker unit is shown in the test or disconnected position. When the breaker unit is inserted to the connected or operating position by means of the levering device, the disconnecting contact members 25 engage stationary contact members 26, thereby connecting the circuit breaker to power conductors 28 which are connected to the stationary contact members 26.

In the present instance, the levering device comprises a pair of lever arms 31 which are secured to a horizontal shaft 32 rotatably mounted in the circuit breaker unit. The shaft 32 is driven by a worm 33 and a worm gear 34 which is secured to the shaft 32. The worm 33 is driven in a manner which will be described more fully hereinafter.

A roller 35 is provided at the end of each one of the lever arms 31 and is disposed in a slot provided between angle members 36 and 37 which are secured to a channel member 38 which, in turn, is secured to angle frame members 12 at the side of the cell structure. Since a lever arm 31 and cooperating angle members 36 and 37 are provided at opposite sides of the breaker unit, a levering force is applied at both sides of the breaker unit.

It will be seen that when the shaft 32 is rotated to drive the arms in a direction indicated by the arrow in FIG. 1, the rollers 35 move in the slots between the members 36 and 37 which, as previously explained, are secured to the sides of the cell structure, thereby drawing the circuit breaker unit into the cell to the connected position. When the shaft 32 is rotated in the opposite direction, force is applied through the arms 31 to move the breaker unit from the connected to the disconnected position shown in the drawing. As indicated by the broken lines, each roller 35 moves through an angle slightly over 180° during the movement of the breaker unit from the test to the connected position.

As explained hereinbefore, it is advantageous to operate the levering device, by means of an electric motor, thereby reducing the manual labor to move the breaker unit into the cell. Also, the operation of an electric motor may be controlled from a remote location. Furthermore, it is desirable to be able to operate the levering device manually in case of failure of the power source for operating the electric motor drive. Thus, provision is made for operating the levering device by means of an electric drive comprising a motor 41, a reduction gear unit 42, sprocket wheels 43 and 44 connected by chain 45 and an electrically actuated clutch 46. The clutch 46 is actuated in one direction by a solenoid device 47 through a lever 48 which is pivoted at 49. The clutch 46 is biased in the opposite direction by a spring 50. The levering device may also be operated manually by means of a crank 51 connected to the shaft 61.

As shown most clearly in FIG. 2, the motor 41 and the reduction gear unit 42 are mounted on a bracket 53 which is attached to the breaker unit 21. The sprocket wheel 44 is mounted in a U-shaped bracket 54 also attached to the breaker unit 21. Likewise, the solenoid 47 is supported by a bracket 55 attached to the breaker unit 21. The lever 48 is supported by a bracket 56 also attached to the breaker unit 21. The fulcrum point 49 for the lever 48 is located on the bracket 56.

The sprocket wheel 44 is secured to a sleeve 57 which is rotatably mounted on the shaft 52, thereby permitting the shaft 52 to rotate within the sleeve 57. The clutch member 46 is slidably disposed on the shaft 52, but a pin 58, which extends through the member 46, causes the shaft 52 to rotate with the clutch member 46 when the clutch is in engagement with the sleeve 57. A slot 59 in the member 46 permits longitudinal movement between the member 46 and the shaft 52.

As shown most clearly in FIG. 2, the worm 33 is secured to the shaft 52 which is rotatably mounted in a bracket 62 attached to the side of the breaker unit 21 by bolts 60. The shaft 61 may be connected to the shaft 52 when the shaft 61 is moved longitudinally to cause a pin 63 to enter a slot 64 in one end of a coupling sleeve 65. The other end of the coupling sleeve 65 is connected to the shaft 61 by means of a pin 66 disposed in a slot 67 in the sleeve 65. A spring 68 disposed between one end of the coupling sleeve 65 and a washer 69 pinned to shaft 52 permits longitudinal movement of the sleeve 65 on the shaft 52. However, the pin 66 is always disposed in the slot 67 to connect the coupling sleeve 65 to the shaft 61.

As explained hereinbefore, it is desirable to provide an interlocking mechanism to prevent operation of the levering device while the contact members of the circuit breaker are closed. The interlocking mechanism utilized in the present structure comprises a bell crank lever 71 which is pivotally mounted on a bracket 72 which is attached to the frame structure of a breaker unit 21. One arm of the bell crank lever 71 is connected to an interlocking bar 73 which is slidably disposed in a portion of the bracket 72. A spring 74 is disposed on the bar 73 to bias the bell crank lever 71 clockwise, as shown in FIG. 3. Thus, the bell crank lever 71 biases the shaft 61 to the left, as shown in FIGS. 2 and 3. A washer 75 is provided between the end of the bell crank lever 71 and a pin 76 which extends through the shaft 61. A bracket 77 is fixedly mounted by any suitable means on a portion of the bell crank 71 adjacent the shaft 61 and serves as a support for a pivotal connector 78 mounted thereon by means of a pivot 79 for rotation about an axis parallel to the axis of rotation of the bell crank 71. A pin 80 extends through the body of the connector 78 perpendicularly to the axis of rotation of the connector and serves at its ends as support for a pair of interlock operating levers 81 and 82. Operating lever 81 is connected at one of its ends for pivotal movement about the pin 80 and is connected at the other end by means of a slot 83 on the lever 81 to a pin 84 on the upper end of solenoid operated lever 48.

As previously explained, to electrically operate the levering device, it is necessary to move the clutch 46 to the right to connect the shaft 52 to be driven by the sleeve 57 in response to operation of the motor 41, or, alternatively, to manually operate the levering device it is necessary to move shaft 61 longitudinally to the right to connect shaft 61 to shaft 52. When the contact members of the circuit breaker are opened, the shaft 61 and the clutch operating lever 48 are free to move to the right as shown in FIGS. 2 and 3. However, when the contact members of the circuit breaker are closed, a member 97 which is connected to the circuit breaker mechanism, is moved to the left, from the position shown in FIG. 3, to interfere with the movement of interlocking bar 73 and the bell crank lever 71. Thus, shaft 61 is prevented from moving longitudinally to the right by means of the washer 75 and pin 76 bearing against the end of bell crank 71, and, at the same time, the clutch operating lever 48 is prevented from moving clockwise to engage the clutch 46 by means of operating rod 81 which is held to the left by the immovable condition of the bell crank lever 71. Accordingly, the levering device cannot be operated to move the circuit breaker unit between the test and the connected position.

Furthermore, when the clutch operating lever 48 is moved clockwise to operate the clutch 46 to turn shaft 52, or when the shaft 61 is moved to the right to engage shaft 52, the interlocking bar 73 (FIG. 3) moves to the position indicated by the broken lines to prevent closing the contact members of the circuit breaker when the breaker unit is being moved between the test and the connected positions.

As previously described, it is desirable to prevent release of the interlocking bar 73 whenever the breaker unit is at any position between the connected and the test position in the cell, and, at the same time, it is desirable to provide for releasing the interlock mechanism at the completion of a breaker connection operation even if the clutch 46 should fail to release. To this end, there is provided a generally U-shaped lever 98 pivotally mounted on pins 85 and 86 in the bracket 62. The previously described interlocking operating lever 82 is pivotally attached at one of its ends to one end of the shaft 80 in the pivotal connector 78 on the bell crank 71, and is pivotally attached at its other end to a pivot 87 connected between the members of the U-shaped lever 98. The U-shaped member 98 is actuated by a cam 88 to hold the lever 98 in a position relatively counterclockwise to that shown in FIG. 2 for any position of the levers 31 other than the position of the levers 31 at the start of a levering operation as shown in FIG. 1 or at the end of a levering operation as shown in FIG. 2. Thus, the engagement of the cam 88 with lever 98 moves operating rod 82 to the right to operate the bell crank 71 counterclockwise as viewed in FIG. 3. Thus, the interlocking bar 73 cannot move to a position to clear the member 97 to permit closing the contact members of the circuit breaker unit. It will be noted that the arm 31 in FIG. 3 is shown in the position in which the circuit breaker unit is fully inserted into the connected position in the cell. Thus, lever 98 is disengaged from cam 88 and the bell crank 71 is moved clockwise in FIG. 3 under the urging of biasing spring 74 to the interlock release position.

The operation of the driving mechanism may be understood by referring to FIG. 4. Assuming that it is desired to operate the levering device to move the circuit breaker unit from the test to the connected position, a switch 91 may be closed to connect the motor 41 and the solenoid 47 to power conductors L1 and L2. It is assumed that a reversing switch 92 is in the proper position to cause the motor 41 to operate in the proper direction for moving the breaker unit from the test to the connected position. When the switch 91 is closed, a winding 93 of the motor 41 and the solenoid coil 47 are energized simultaneously through the contact members of a limit switch 95 and the reversing switch 92. A winding 94 of the motor 41 is also energized through the contact members of the limit switch 95 and the reversing switch 92. Thus, the motor 41 drives the sleeve 57 and the solenoid 47 actuates the clutch member 46 into engagement with the sleeve 57, thereby rotating the shaft to drive the worm 33 and operate the levering device in the manner previously explained.

It is assumed that the contact members of the circuit breaker are open so that the interlocking mechanism will permit pivotal movement of the lever 48 or longitudinal movement of the shaft 61. In case the contact members of the breaker are closed, neither the solenoid mechanism nor the shaft 61 may move to engage the shaft 52. Accordingly, if the electrical drive is operated, the sleeve 57 merely rotates freely on the shaft 52.

When the breaker unit is moved to the connected position, the arm 31 of the levering device opens the limit switch 95, thereby deenergizing the motor 41 and the solenoid 47. If the clutch 46 should bind so as to fail to release, the disengaged relationship between the cam 88 and lever 98 allows the bell crank to rotate clockwise as shown in FIG. 3 under the urging of spring 74. It is seen that inasmuch as lever 48 is not fixedly attached to clutch 46, the lever 48 may move freely in a counterclockwise direction under the urging of operating rod 81 away from the clutch 46 so as to provide no resistance to the movement of the bell crank 71 clockwise. Thus, though the clutch 46 should bind, the completion of a levering operation nevertheless effects release of the interlock mechanism to allow closing of the contacts in the circuit breaker unit.

If it is desired to operate the motor drive to move the breaker unit from the connected to the test or disconnected position, the same procedure is followed with the exception that the reversing switch 92 must be operated to a position to cause the motor 41 to rotate in the opposite direction. When the switch 91 is closed, the circuits to the motor and the solenoid are established through a limit switch 96 which was permitted to close during operation of the levering device to move the breaker into the cell. The limit switch 96 functions to disconnect the motor and the solenoid when the breaker unit is moved to the test position. As previously explained, it is necessary for the contact members of the circuit breaker to be opened to permit operation of the levering device. Otherwise, the clutch 46 cannot engage the sleeve 57 to cause rotation of the shaft 52.

In case it is desired to operate the levering device manually, the crank 51 is placed on the end of the shaft 61 and is moved longitudinally to the right to engage the pin 63 with the coupling member 65 in the manner previously explained. The spring 50 prevents the clutch 46 from engaging the sleeve 57 while the slot 83 in the operating rod 81 prevents engagement between the operating rod 81 and the lever 48 when the operating rod 81 is moved to the right, thus maintaining the clutch in the disengaged position. It is, of course, necessary for the contact members of the circuit breaker to be opened to permit longitudinal movement of the shaft 61. Otherwise, the interlocking mechanism will prevent the longitudinal movement of the shaft. After the shaft 61 has been moved longitudinally, it may be rotated by the crank 51 to operate the levering device to move the circuit breaker unit in the desired direction.

From the foregoing, it is apparent that there is provided means for operating a levering device either manually or electrically through operation of a shaft for both operations. A mechanical interlocking device responds to either operation to prevent closing of the breaker during a levering operation, and releases automatically at the end of a levering operation even if the electrically responsive operating mechanism should fail to release.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a switchgear structure, in combination, a cell, a circuit breaker unit having openable and closable contact members disposed in the cell, a levering device for moving the breaker unit between connected and test positions in the cell, a motor mounted on the breaker unit, an electrically actuated clutch for connecting the motor to the levering device to operate the levering device, mechanical interlocking means actuated by said levering device for preventing closing the contact members of the circuit breaker when the breaker unit is at any position between the connected and the test positions, and said interlocking means being releasable independently of said clutch for permitting closing of the circuit breaker when the breaker is in the test position or the connected position even if the clutch should fail to release.

2. In a switchgear structure, in combination, a cell, a circuit breaker unit having openable and closable contact members disposed in the cell, a levering device for moving the breaker unit between connected and test positions in the cell, shaft means for operating the levering device, means for operating the shaft to operate the levering device, interlock means responsive to operation of the shaft operating means to prevent the closing of the breaker contacts when the breaker unit is at any position between the connected and the test positions, said interlock means including means operable independently of the shaft operating means and responsive to operation of the levering device to render the interlock means ineffective when the breaker is in the test position and the connected position, and lever means interconnecting the shaft operating means and the interlock means.

3. In a switchgear structure, in combination, a cell, a circuit breaker unit having openable and closable contact members disposed in the cell, a levering device for moving the breaker unit between connected and test positions in the cell, a rotatable shaft for operating the levering device, a motor mounted on the breaker unit, an electrically actuated clutch for connecting the motor to the shaft to rotate the shaft and operate the levering device, mechanical interlocking means actuated by said levering device for preventing closing the contact members of the circuit breaker when the breaker unit is at any position between the connected and the test positions and said interlocking means being releasable independently of said clutch for permitting closing of the breaker when the breaker is at the test or connected positions regardless of the conditions of operation of the clutch.

4. In a switchgear structure, in combination, a cell, a circuit breaker unit having openable and closable contact members disposed in the cell, a levering device for moving the breaker unit between connected and test positions in the cell, a manually rotatable shaft for operating the levering device, a motor mounted on the breaker unit, an electrically actuated clutch for connecting the motor to the shaft to rotate the shaft and operate the levering device, mechanical interlocking means for preventing operation of said clutch when the contact members of the circuit breaker are closed, additional mechanical interlocking means for preventing closing the contact members of the circuit breaker when the breaker unit is at any position between the connected and the test positions, and said additional interlocking means being releasable independently of said clutch for permitting closing of the breaker contact when the breaker is at the test or connected position even if the clutch should fail to release.

5. In a switchgear structure, in combination, a cell, a circuit breaker unit having openable and closable contact members disposed in the cell, a levering device for moving the breaker unit between connected and test positions in the cell, a shaft connected to the levering device and operable when rotated to operate the levering device, a motor mounted on the breaker unit, an electrically actuated clutch for connecting the motor to the shaft to rotate the shaft, manually responsive shaft rotating means normally disengaged from said shaft and adapted for engagement with the shaft to operate the levering device, mechanical interlocking means operable in a first position for preventing engagement of the clutch and the manually responsive means with said shaft and operable in a second position for preventing closing of the circuit breaker when either the manually responsive means or the clutch means is engaged with the shaft means, lever means interconnecting the interlocking means and the clutch actuating means, and additional mechanical interlocking means operable by said levering device to maintain the said interlocking means in the second operating position when the breaker unit is at any position between the connected and test positions.

6. In a switchgear structure, in combination, a cell, a circuit breaker unit having openable and closable contact members disposed in the cell, a levering device for moving the breaker unit between connected and test positions in the cell, a shaft connected to the levering device and operable when rotated to operate a levering device, a motor mounted on the breaker unit, an electrically actuated clutch for connecting the motor to the shaft to rotate the shaft, manually responsive shaft rotating means normally disengaged from said shaft and adapted for engagement with the shaft to operate the levering device, mechanical interlocking means operable in a first position for preventing engagement of the clutch and the manually responsive means with said shaft when the contact members of the circuit breaker are closed, and operable in a second position for preventing closing of the circuit breaker when either the manually responsive means or the clutch is engaged with the shaft, lever means interconnecting the interlocking means and the clutch actuating means and additional interlocking means responsive to the levering device and directly connected to the said interlocking means to maintain said interlocking means in said second operating position when the breaker unit is at any position between the connected and test positions.

References Cited in the file of this patent
UNITED STATES PATENTS
2,792,462    Kozlovic  ---------------- May 14, 1957